United States Patent
Flores Rios et al.

(10) Patent No.: US 12,223,524 B1
(45) Date of Patent: Feb. 11, 2025

(54) SYSTEMS AND METHODS FOR SELECTING PRODUCT PLACEMENT LOCATIONS AND PRODUCTS

(71) Applicant: Amazon Technologies, Inc., Seattle, WA (US)

(72) Inventors: Mauricio Alejandro Flores Rios, Seattle, WA (US); Han-Kai Hsu, Seattle, WA (US); Yujia Chen, Bellevue, WA (US); Linda Liu, Seattle, WA (US); Yash Chaturvedi, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/847,775

(22) Filed: Jun. 23, 2022

(51) Int. Cl.
  *G06Q 30/00* (2023.01)
  *G06Q 30/0242* (2023.01)
  *G06V 20/40* (2022.01)
  *H04N 21/81* (2011.01)
  *G05B 19/418* (2006.01)

(52) U.S. Cl.
  CPC ......... *G06Q 30/0242* (2013.01); *G06V 20/49* (2022.01); *H04N 21/812* (2013.01); *H04N 21/8146* (2013.01)

(58) Field of Classification Search
  CPC .. G06Q 30/0242; G06V 20/49; H04N 21/812; H04N 21/8146
  See application file for complete search history.

(56) References Cited

U.S. PATENT DOCUMENTS

| | | | |
|---|---|---|---|
| 2006/0155615 A1* | 7/2006 | Loo | G06Q 30/02 705/14.1 |
| 2007/0124762 A1* | 5/2007 | Chickering | H04H 60/375 348/E7.071 |
| 2008/0172293 A1* | 7/2008 | Raskin | G06Q 10/04 705/14.1 |
| 2015/0139488 A1* | 5/2015 | Dharssi | G06Q 30/02 382/103 |

(Continued)

OTHER PUBLICATIONS

"Contextual Internet Multimedia Advertising". IEEE. 2010. (Year: 2010).*

(Continued)

*Primary Examiner* — Maria V Vanderhorst
(74) *Attorney, Agent, or Firm* — Eversheds Sutherland (US) LLP

(57) ABSTRACT

Systems, methods, and computer-readable media are disclosed for determining virtual product placement opportunities in a media content and determining product candidates for virtual insertion into the media content. The product placement system may determine shot segments from the media content and for each shot segment may determine candidate product placement locations. The product placement system may determine contextual information from the shot segments and from the contextual information determine candidate products suitable for the product placement locations. The product placement system may determine total screen time for each product placement opportunity as well as quality of each opportunity. For each product and product placement opportunity, the product placement system may determine an expected revenue and a projected insertion cost.

18 Claims, 6 Drawing Sheets

(56) References Cited

U.S. PATENT DOCUMENTS

| | | | |
|---|---|---|---|
| 2017/0201779 A1* | 7/2017 | Publicover | H04N 21/4532 |
| 2019/0122378 A1* | 4/2019 | Aswin | G06T 7/20 |
| 2021/0201956 A1* | 7/2021 | Stephens | G06T 7/50 |
| 2022/0383615 A1* | 12/2022 | Saraee | G06F 16/9535 |

OTHER PUBLICATIONS

"Predicting Content Similarity via Multimodal Modeling for Video-In-Video Advertising". IEEE. 2021. (Year: 2021).*

* cited by examiner

SYSTEMS AND METHODS FOR SELECTING PRODUCT PLACEMENT LOCATIONS AND PRODUCTS

BACKGROUND

Strategic placement of products with visible labels in to movies and television shows has been used over the years for advertising purposes. For example, a soda company may pay a studio for the right to visibly feature their product during a well-known sitcom. The product may simply rest on a counter in plain sight as the scene unfolds in the surrounding environment. The label of the product may face the camera such that a viewer may clearly make out the brand. The mere presence of the product in the scene that may be watched by millions of people may serve as a form of advertising for the product. This is especially true if a likable character or fan favorite appears to own or possess the item. While product placement in television and movies is common practice, it is limited in that the product must be present and exist at the time of filming. In other words, the physical product must be in the scene. As time goes on, the product in the scene may be discontinued or the brand may change, and any viewing after such change may no longer have the same advertising benefit.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
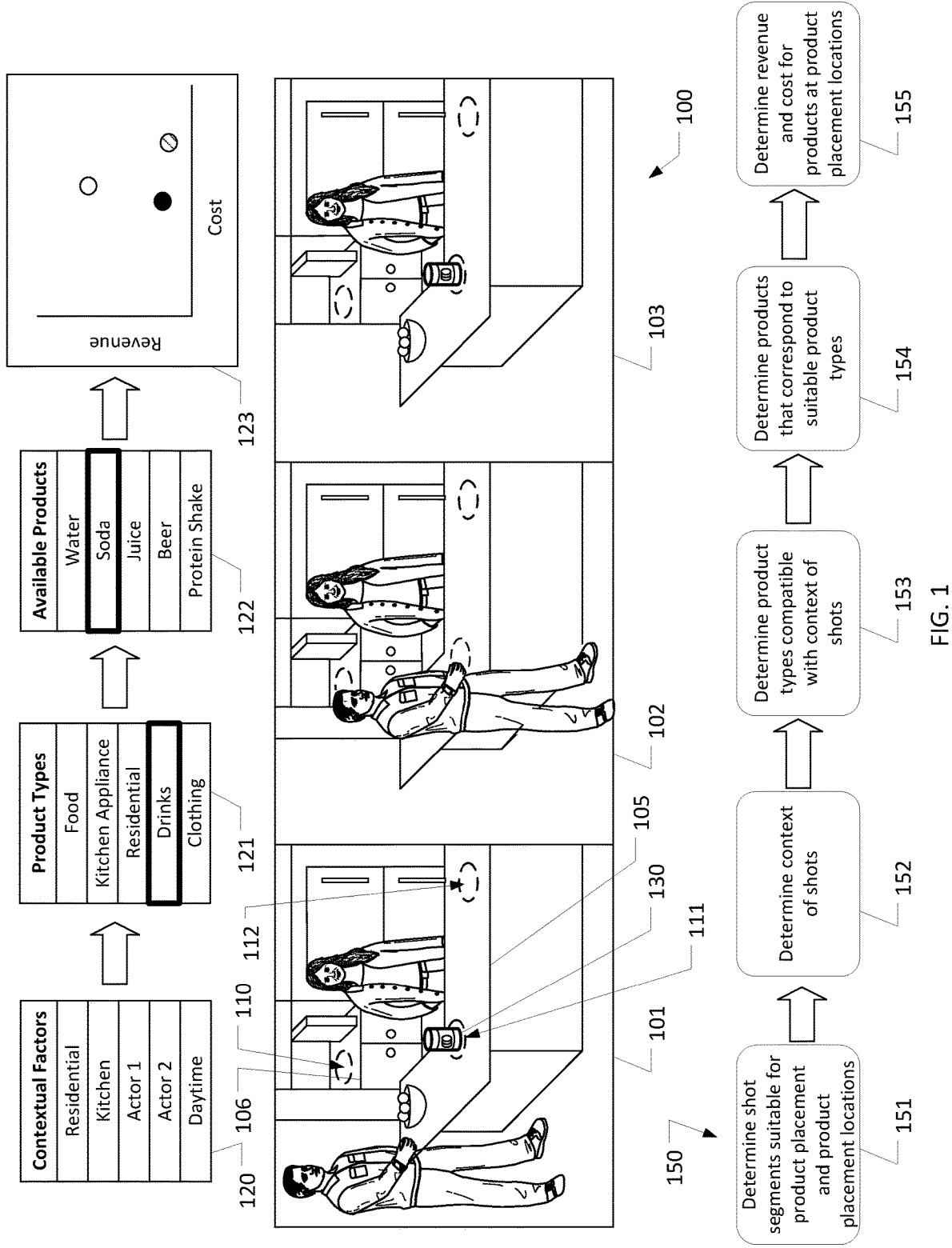
FIG. 1 is a schematic illustration of an example use case for determining shot segments, product placement locations, candidate products, and revenue analysis in accordance with one or more example embodiments of the present disclosure.

The systems and method herein may be used to determine virtual product placement locations in digital media such as videos (e.g., television and movies), streaming media, and live media, and may determine candidate products suitable for the product placement locations. The systems and methods may also determine expected revenues and costs associated with the product placement opportunities and may rank the product placement locations and/or product candidates. Products may be placed into the digital media during post production or even for a significant period of time after filming and production. In this manner, products may be digitally and/or virtually placed into the digital media at any time and may even be replaced and/or updated.

The systems and methods herein may be used to process digital media (e.g., a video) and determine shot segments that form the digital media. For example, shot segments may be still frames of the video that together form the video. Each shot may be processed using computer vision models to detect empty spaces suitable for product placement. For example, the empty spaces may be suitable for a two-dimensional (2D) or three-dimensional (3D) product placement. In one example, the location for product placement may be a tabletop, book shelve, parking spot, television, billboard, and/or wall space. The locations may be ranked according to attributes favorable for visibility such as size and/or proximity to the center of the image, with close proximity to center of the image being favorable. Other attributes may include visual appeal (e.g., whether scene is dirty, clustered or clear) and 2D versus 3D placement.

The shot segments of the digital media may further be analyzed to determine contextual factors present in each shot. For example, a model may be trained using a library of various media content (e.g., from different genres and settings) to learn settings and objects that may be associated with one another. For example, the model may be trained to identify a kitchen setting and learn objects that are commonly found in such a setting (e.g., a blender, coffee machine, food, drinks, produce, etc.). Using the trained model, products associated with each shot segment may be determined as candidate products. These products may be ranked to determine which products are most suitable for the context of the scene.

The shot segments may further be processed using computer vision models to determine all segments sharing the same setting or surrounding area (e.g., kitchen, office, etc.) and having the same placement location visible (e.g., a desk or tabletop) to determine continuity of placement locations across multiple shots. Further, the shot segments may be analyzed to determine the total number of shots with an empty space and a placement location and the total time associated with a placement location.

For the products determined to be suitable candidates for product placement (e.g., based on contextual factors), potential revenue associated with product placement of the product at one or more location may be determined. The potential revenue may be based on the type of product, the size of the product on the screen, a total duration that the product appears on the screen, and/or the actors or actresses present on the screen at the same time or any other factors that may affect revenue.

A cost value may also be determined corresponding to the product and the placement opportunity. The cost value may be based on the complexity of virtually and/or digitally inserting the product for the placement opportunity. The cost value may depend on if the object is moving, the lighting conditions, and/or any obstructions by other objects, for example. The revenue opportunity may be compared to the estimated cost value to determine projected profits and the projected profits at various placement opportunities may be compared for one or more products.

Referring to FIG. 1, an example use case 100 for virtual product placement is illustrated in accordance with one or more example embodiments of the disclosure. As shown in FIG. 1, various shot segments may be determined from certain media content. In FIG. 1, shot segments of a television sitcom are illustrated. The video may have been processed to create shot segment 101, shot segment 102, and shot segment 103, which may be arranged chronologically from left to right.

The shot segments may be processed to determine product placement locations in each shot segment, product candidates for the product placement opportunities, and a cost revenue analysis. For one or more product candidate and/or one or more product placement opportunity. The operations and functionality illustrated in FIG. 1 may be performed by server, which may be one or more computing devices having a processor. The server may be the same as server 600 of FIG. 6.

To initiate the actions of determining shot segments, product placement locations, candidate products, and cost and revenue analysis, example process flow 150 is presented and may be performed. At a block 151, the product placement system may analyze certain digital media (e.g., a video, streaming content, live content, television show, move, social media post, or the like). The shot module may process the digital media, a television show in this example, and may determine shot segments from the television show.

Shot segments may be still frames and/or may correspond to a time duration (e.g., 1 second). For example, as shown in FIG. 1, a portion of a video may be reduced to shot segment 101, shot segment 102, and shot segment 103. These shot segments may be chronological and may represent a sitcom with two actors having a conversation in a kitchen area. Shot segments 101-103 may be exemplary of shot segments of the video, which may include several more shot segments. The product placement system may determine shot segments with empty 2D and 3D spaces such as shot segments 101-103 which include several empty spaces.

For each shot segment suitable for product placement (e.g., having at least one empty space), the product placement system may determine product placement locations. For example, a model may be trained to detect empty spaces in shot segments (e.g., both 2D and 3D empty spaces). Product placement locations may be located in the empty spaces and more than one product placement location may be determined for a single empty space. For example, in shot segment 101, empty space 105 and empty space 106 may be determined.

Empty space 105 may be a countertop in a kitchen and empty space 106 may be shelf space in kitchen cabinetry. The product placement system may determine empty space 106 includes candidate location 110 and that empty space 105 may include candidate locations 111 and 112. Candidate locations 110-112 are exemplary and it is understood that more product placement locations may be determined in empty space 105 and/or empty space 106 or any other empty spaces in the shot segments.

At block 152, the context of each suitable shot segment may be determined by the product placement system. For example, a model may be trained to recognize contextual factors present within each shot segment. For example, the model may be trained to recognize a type of setting (e.g., residential, office, street, outdoors, kitchen, bedroom, bathroom, car, etc.), various objects present in the scene (e.g., food, drinks, television, car, computer, dog, etc.), and/or actors and actresses present in a scene (e.g., using facial recognition techniques).

The product placement system may process shot segments 101-103 and determine contextual factors 120. Specifically, contextual factors 120 may indicate that the setting is residential, that the setting is in the kitchen, that a certain actress and actor are in the scene, and further that the scene occurs during the day. It is understood that the product placement system may be trained to determine any other contextual factors about the shot segments.

At block 153, the product placement system may determine types of products that may be compatible with the contextual factors of the shot segments. For example, a product placement system may include a model trained to analyze shot segments and contextual factors and determine which product types 121 which are commonly found together with contextual factors 120. For example shot segments 101-103 may be analyzed to determine food, kitchen appliances, residential products, drinks and clothing are often found in settings having the contextual factors determined at block 152. The candidate products types may be analyzed to determine the most common product type, which in this case may be drinks.

At block 154, the product placement system may determine products that correspond to the suitable product types. For example, an approved, preferred, and/or available product list may be determined that may be selected from. For example, available products 122 that correspond to drinks, for example, may include water, soda, soap, beer, and protein shakes. Each available product may also be associated with a brand. The product placement system may further include a model trained to determine the product match based on the contextual factors. For example, the product placement system may determine that the most suitable product to include in shot segments 101-103 is soda. This determination may also or alternatively be based on the product placement location and/or size. As shown in FIG. 1, the soda 130 was determined to be the most suitable product for placement at location 111.

At block 155, the product placement system may determine an expected revenue amount associated with the specific product at certain product placement location corresponding to a number of shot segments. This may be based on a number of expected impressions from the virtual product placement. The number of expected impressions may be based on the proximity of the placement location to the center of the screen, the size of the product placement, the amount of time on screen, proximity to a well-known actor, proximity to the focal point of the scene, and/or any other factors that may affect revenue.

A cost value corresponding to an expected cost for inserting a product into a scene at a certain location may also be determined. The cost value may be influenced by the complexity of inserting the product. For example, obstructions of the product, movement of the product and/or lighting conditions may affect this value. A cost vs. revenue analysis may be performed for one or more products and/or one or more locations to consider the expected profit for a given product. For example, revenue analysis 123 illustrates the cost and revenue for soda 130 at candidate locations 110-112.

Revenue analysis 123 may indicate that the cost of inserting soda 130 at candidate location 112 may be low because the product will not be obstructed in shot segments 101-103, but revenue is also low because the location is far from the center of the screen. Revenue analysis 123 may further indicate that the cost of inserting soda 130 at candidate location 110 may be high because the product is at least partially obstructed at shot segment 102 and further product placement at this location is also low because the object size is smaller and the location is far from the center of the screen.

Finally, revenue analysis 123 may indicate that the cost of inserting soda 130 at candidate location 110 may be high because the product is obstructed at shot segment 102 but the revenue is high because the object size is large and the location is near the center of the screen. For this reason, product placement system may recommend that soda 130 may be selected as the most suitable product candidate and further that candidate location 111 be selected as the most suitable product location candidate.

Illustrative Process and Use Cases

Figure 2:
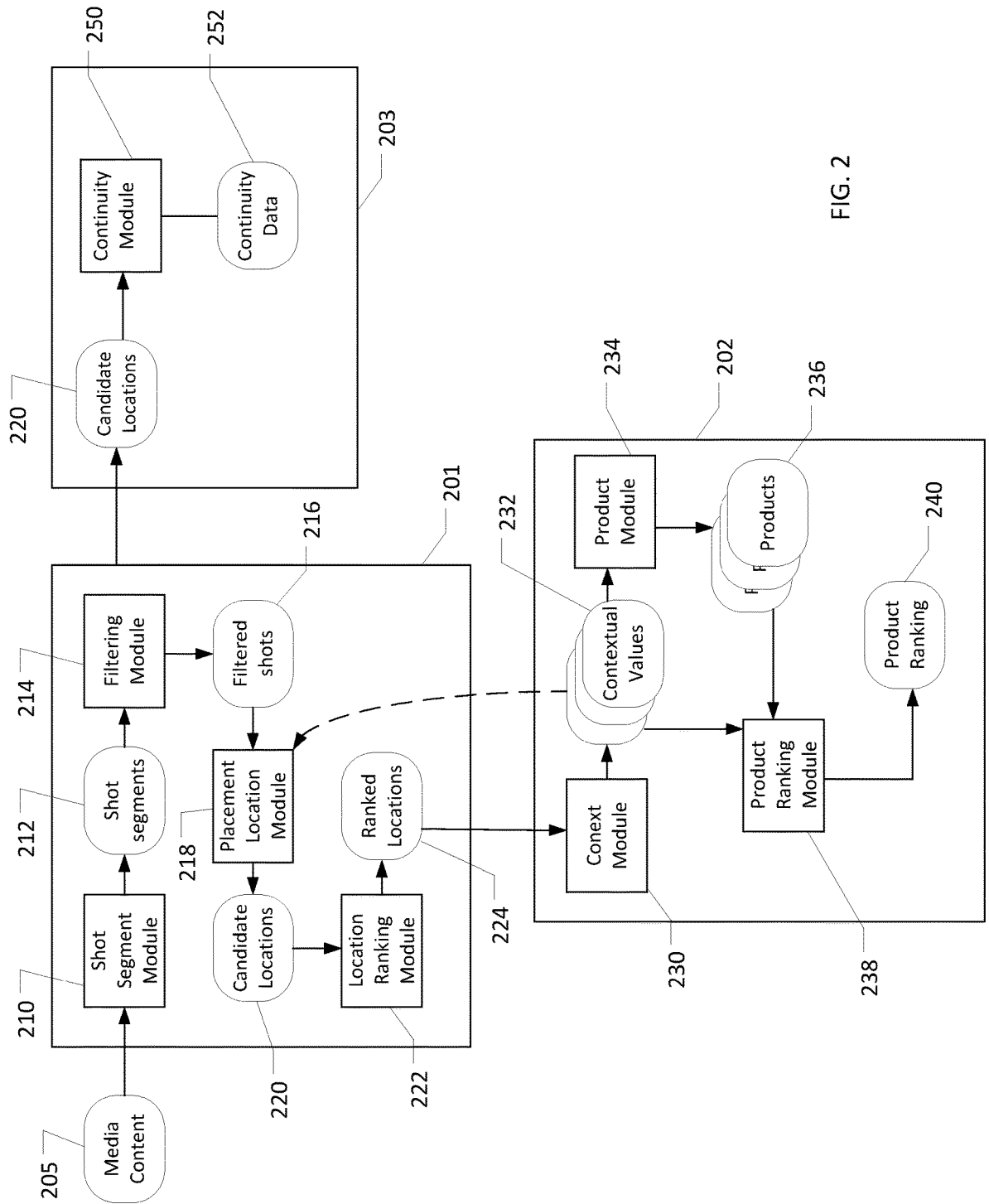
FIG. 2 is a schematic illustration of example data flow for determining ranked locations, product rankings, and continuity data in accordance with one or more example embodiments of the present disclosure.

Referring now to FIG. 2, an example of the product placement system including shot system 201, product system 202, and continuity system 203 is illustrated. Shot system 201, product system 202, and continuity system 203 may each run on one or more server having a processor, such as server 600 of FIG. 6. The server may include one or more servers and/or otherwise communicate with other servers, databases, datastores, and the like. The server may be a computing device with a processor and may run one or more applications and/or platforms.

It is understood that shot system 201, product system 202, and continuity system 203 may run on the same server or one or more of the foregoing may run on different servers which may be in communication with one another over any well-known wired or wireless connection (e.g., Wi-Fi, cellular network, Bluetooth, Bluetooth Low Energy (BLE), near field communication protocol, etc.).

As shown in FIG. 2, shot system 201 may include shot segment module 210, filtering module 214, placement location module 218, and location ranking module 222, which may be submodules. Shot segment module 210 may process media content 205. Media content 205 may be any type of media content having an image, such as video content (e.g., movie, television, etc.), streaming content, live content, social media content, and any other content, including an image. Shot module 210 may include one or more algorithms (e.g., machine learning models that may employ computer vision) to divide media content into shot segments 212. Each shot segment may be a still frame from the media content and/or may correspond to a time segment (e.g., 1 second). Alternatively, shot system 201 may receive predetermined shot segments.

Filtering module 214 may process shot segments 212 for quality and may dismiss shot segments 212 having insufficient quality. For example, filtering module 214 may include one or more algorithms (e.g., machine learning models that may employ computer vision) that analyzes each shot for visual factors including image blur, monochrome colors, dirty and/or cluttered scenes, and/or poor lighting. For example, filtering module 214 may generate a value for one or more of the following factors and may have an adjustable threshold for the factors.

If the value of a shot fails to satisfy the corresponding threshold, that particular shot segment may be dismissed or otherwise disregarded. For example, if the image in the shot segment is too blurry, too monochromatic, too dirty or cluttered, and/or has poor lighting, the shot segment may be dismissed. The shot segments 212 with certain unsatisfactory shot segments removed or disregarded resulting in filtered shots 216.

Filtered shots 216 may be analyzed by placement location module 218. Placement location module may include one or more algorithms (e.g., machine learning models that may employ computer vision) trained to determine 2D and 3D *empty* spaces in shot segments (e.g., tabletops, shelving, billboards, empty wall space, television or computer screens, semi-truck sides, and/or any other blank or empty spaces).

For each empty space in each shot segment, placement location module 218 may determine candidate locations 220 (e.g., location/placement opportunities), which may be a boundary (e.g., bounding box) of the empty space suitable for product placement. Placement location module 218 may determine empty space in shot segments based on scenes that have enough visibility and space for a product to be virtually placed into the scene without interrupting the scene and/or storyline. It is understood that the placement location module 218 may include one or more occlusion models and/or occlusion mapping. It is understood that placement location module 218 may optionally additionally process contextual values to determine product placement locations.

Location ranking module 222 may include one or more algorithms (e.g., machine learning models that may employ computer vision) trained to rank the candidate locations to find the most suitable locations of candidate locations 220 for product placement. For example, location ranking module 222 may analyze factors such as visual appeal (e.g., image blur, monochrome colors, dirty/clutter, and/or poor lighting), placement location size, proximity to center of screen or focal point of scene, whether the placement opportunity is a 2D opportunity or 3D opportunity, and/or proximity to a certain actor/actress. The ranking module 222 may output ranked locations 224 which may include candidate locations 220 that have been sorted by most suitable or desirable candidate locations.

Product selection system 202 may analyze the media content to determine potential product candidate for virtual product placement into the media content. Product selection module may include context module 230, product module 234, and product ranking module 238, which may be submodules. Context module 230 may analyze the ranked locations and/or corresponding filtered shots 216 to determine contextual factors with respect to the shot segments corresponding to some or all of the ranked locations.

Context module 230 may include one or more algorithms (e.g., machine learning models that may employ computer vision) trained to process shots segments corresponding to ranked locations 224 and determine contextual values 232 corresponding to certain contextual factors for the shot segments. For example, context module may be trained to determine contextual values 232 indicative of a type of setting (e.g., residential, office, street, outdoors, kitchen, bedroom, bathroom, car, etc.), various objects present in the scene (e.g., food, drinks, television, car, computer, dog, etc.), actors and actresses present in a scene (e.g., using facial recognition techniques) and/or may include information about the size of the placement opportunity and/or the type of the placement opportunity 2D or 3D.

Contextual values 232 may be processed by product module 234, which may include one or more algorithms (e.g., machine learning models that may employ computer vision) trained to determine products corresponding to shot segments. For example, product module may process contextual values 232 to determine products 236 that correspond to contextual values 232. The candidate products may be selected from a predetermined database of products or another collection of products. In one example, product module 234 may determine products 236 that are commonly present in certain scenes or settings (e.g., based on the setting, objects present in the scene, actors present in the scene, etc.). For example, product module may determine that in a kitchen setting, kitchen appliances (e.g., coffee maker) are often present.

Product ranking module 238 may process products 236 to rank products 236 based on the products that are most suitable for ranked locations 224. Product ranking module may further consider contextual values 232 in performing this analysis. In one example, product ranking module 238 may include one or more algorithms (e.g., machine learning models) trained to process products 236 and contextual values 232 to determine the products most suitable ranked locations 224 and output product ranking 240 corresponding to one or more candidate locations 220.

Candidate locations 220 and/or ranked locations 224 and their corresponding shot segments 212 may also be processed by continuity system 203 which may include continuity module 250 which may analyze candidate locations 240, ranked locations 224 and/or shot segments 212 corresponding thereto to output continuity data 252. Continuity module may include one or more algorithms (e.g., machine learning models that may employ computer vision) trained to determine a total amount of time a product placement opportunity is present on screen for media content 205 and/or any obstructions of such product placement opportunities (e.g., actor or object blocking such candidate location). Continuity data 252 may be indicative of the total amount of time a product at such candidate product is visible at a candidate location and/or may be indicative of obstructions or other interruptions of product placement locations. Continuity module 250 may further identify product placement locations in each shot segment that are the same location (e.g., the same location on a countertop in different shots) and may associate such shot segments and/or product locations. This information may permit continuity module 250 to determine a total amount of time a product location appears on screen, for example.

Figure 3:
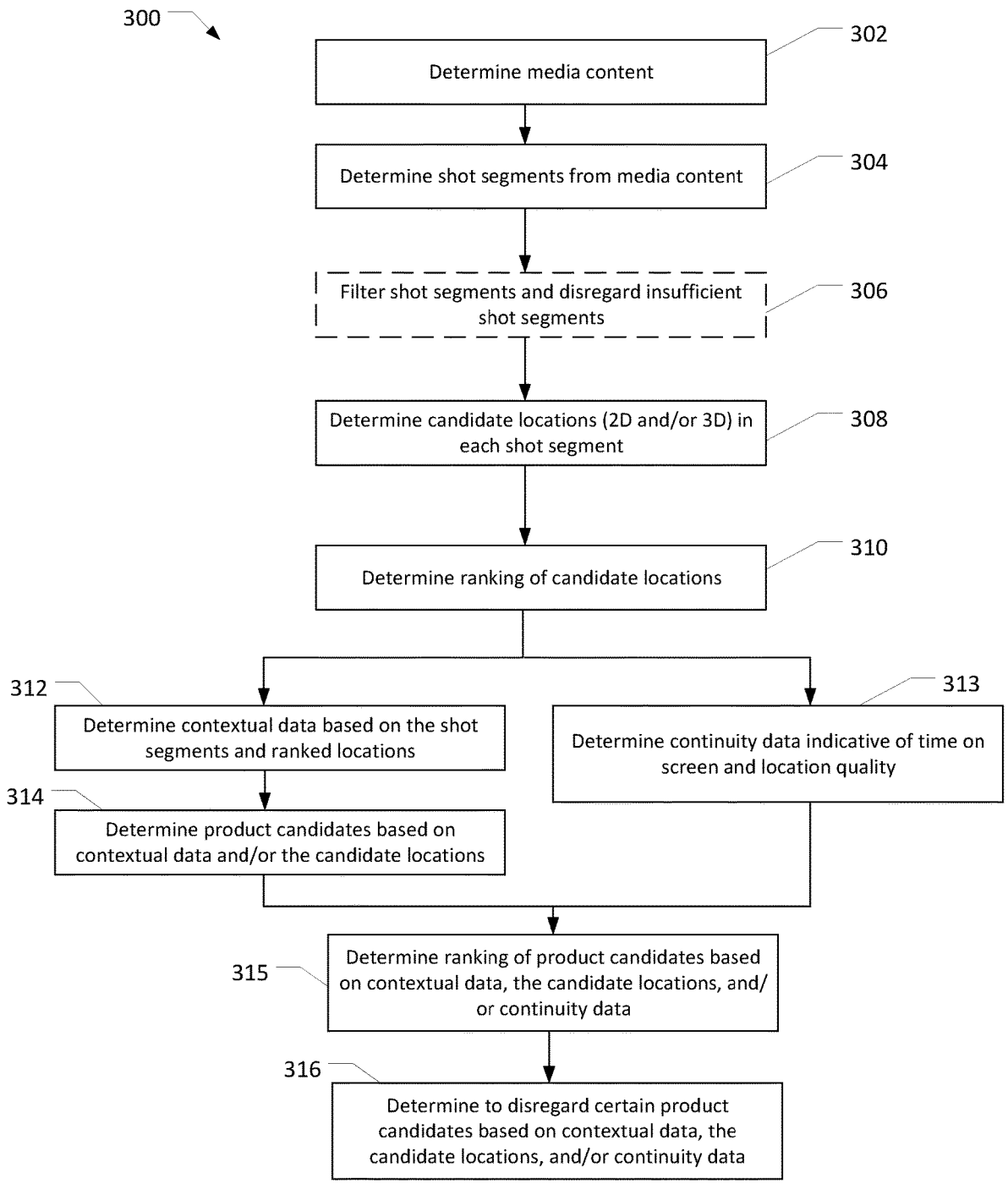
FIG. 3 is a schematic illustration of an example process flow for determining ranked locations, product rankings, and continuity data, in accordance with one or more example embodiments of the present disclosure.

Referring now to FIG. 3 an exemplary process flow 300 for determining shot segments, candidate product placement locations, contextual data and continuity data is depicted. Some or all of the blocks of the process flows in this disclosure may be performed in a distributed manner across any number of devices (e.g., servers and computing devices). Some or all of the blocks of the process flows in this disclosure may be performed in a distributed manner across any number of devices. Some or all of the operations of the process flow may be optional and may be performed in a different order.

At block 302, computer-executable instructions stored on a memory of a device, such as a server, may be executed to determine media content for product placement. The media content may be determined from a database of videos and/or the product placement system may receive instructions from another device to analyze specific media content. At block 304 computer-executable instructions stored on a memory of a device, such as a server, may be executed to determine shot segments from the media content. For example one or more models may be trained to divide the media content into individual shot segments.

At block 306, computer-executable instructions stored on a memory of a device, such as a server, may be executed to filter shot segments and disregard insufficient shot segments. For example, one or more models may be trained to process each shot segments and disregard shot segments that are blurry and/or have poor lighting.

At block 308, computer-executable instructions stored on a memory of a device, such as a server, may be executed to determine candidate product placement locations (e.g., 2D and/or 3D locations) in each shot segment. For example, one or more models (e.g., occlusion models) may be trained to determine empty spaces in each shot segment. For the example, the empty spaces may correspond to a tabletop, shelf, wall space, billboard, and/or any other 2D or 3D open space. For each open space, one or more product placement locations may be identified for placement of a virtual and/or digital product.

At block 310, computer-executable instructions stored on a memory of a device, such as a server, may be executed to determine a ranking of candidate product placement locations. For example, product placement locations may be ranked based on proximity to center of the screen, proximity to an actor, and/or size of product placement location. After block 310, blocks 312 and 313 may be simultaneously initiated or sequentially initiated.

At block 312, computer-executable instructions stored on a memory of a device, such as a server, may be executed to determine contextual data based on the candidate shot segments and/or ranked product placement locations. For example, contextual data may include a type of setting (e.g., residential, office, street, outdoors, kitchen, bedroom, bathroom, car, etc.), various objects present in the scene (e.g., food, drinks, television, car, computer, dog, etc.), and/or actors and actresses present in a scene (e.g., using facial recognition techniques).

At block 314, computer-executable instructions stored on a memory of a device, such as a server, may be executed to determine product candidates based on contextual data and/or candidate locations. For example, a model may be trained to determine product types that commonly appear in scenes similar to the shot segments based on the contextual data. Also the size of a candidate location may influence the product candidate determination. Products available for product placement may then be selected that match with the product types determined. The products selected may further match with attributes of the candidate locations such as 2D vs. 3D and a size of the product placement location. At block 313, which may occur contemporaneously with blocks 312-314 and/or sequentially, computer-executable instructions stored on a memory of a device, such as a server, may be executed to determine continuity data which may be indicative of product placement time and quality of location candidates. For example, the aggregate time for a product placement opportunity may be determined and also any obstructions for the product placement opportunity may be determined.

At block 315, computer-executable instructions stored on a memory of a device, such as a server, may be executed to determine rankings of product candidates based on the contextual data, candidate locations, and/or continuity data. For example, the product candidates may be assigned suitability values that indicate conformity with contextual factors, candidate locations and/or continuity data. The products with the highest values may satisfy several contextual factors, conform to the candidate locations, and/or correspond to continuity data indicative of a certain amount of time on screen without obstruction.

Figure 4:
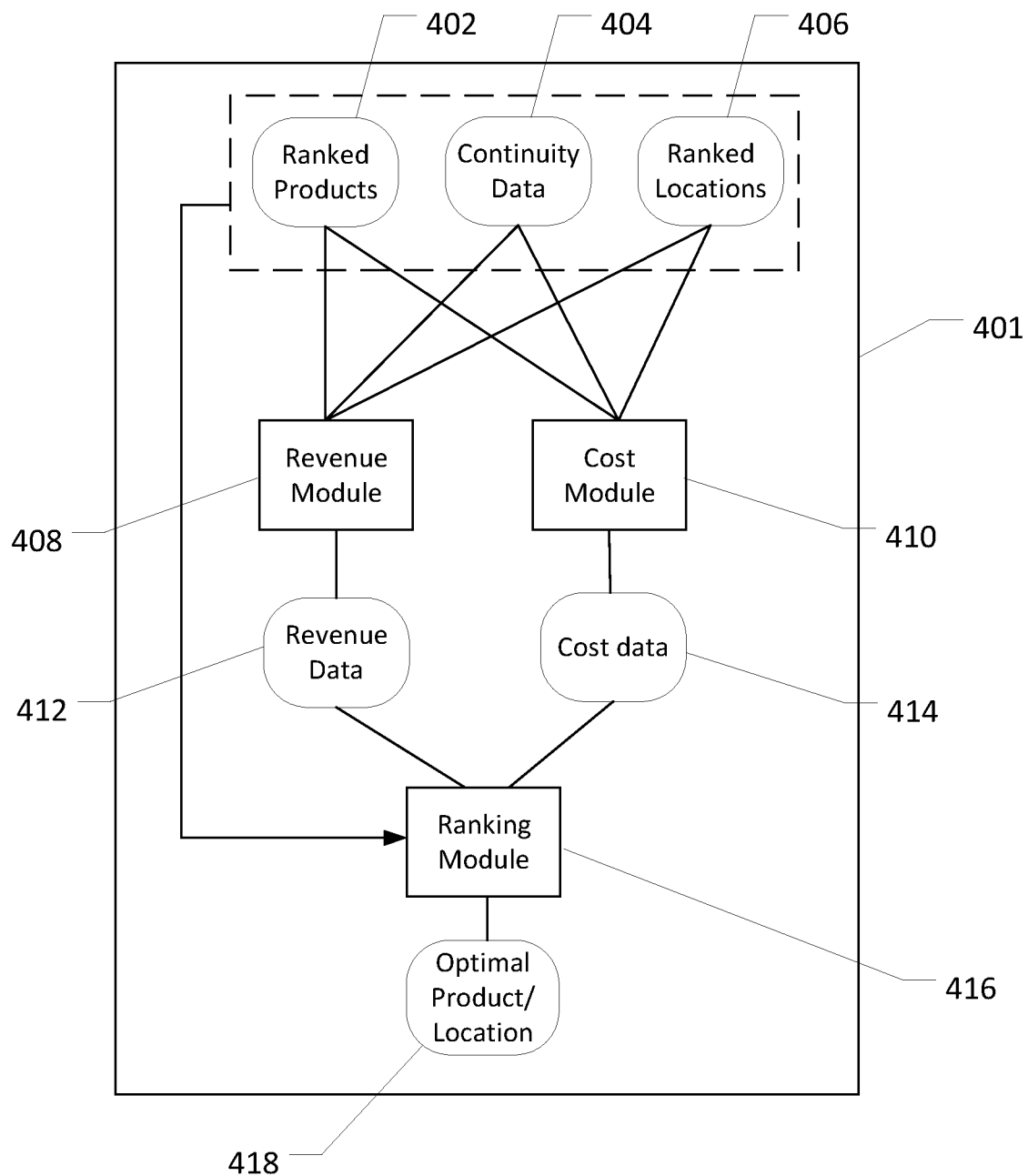
FIG. 4 is a schematic illustration of example data flow for determining profit rankings in accordance with one or more example embodiments of the present disclosure.

At block 316, which may occur contemporaneously with block 317 and/or sequentially, computer-executable instructions stored on a memory of a device, such as a server, may be executed to disregard certain product candidates based on the contextual data, the candidate locations and/or continuity data. For example, if the product placement location is a 2D opportunity, the 3D products may be disregarded. Referring now to FIG. 4 an example of product placement system including revenue system 401 is depicted. It is understood that revenue system 401 may be included as part of the product placement system illustrated in FIG. 2, including shot system 201, product system 202, and continuity system 203. Revenue system 401 may run on one or more server having a processor, such as server 600 of FIG. 6. The server may include one or more servers and/or otherwise communicate with other servers, databases, datastores, and the like. The server may be a computing device with a processor and may run one or more applications and/or platforms.

As shown in FIG. 4, product ranking 402, which may be the same as product ranking 240 and/or may include products 236 of FIG. 2, continuity data 404, which may be the same as continuity data 252 of FIG. 2, and ranked locations 406 which may be the same as ranked locations 224, may be processed by both revenue module 408 and cost module 410. Revenue module 408 may include one or more algorithms (e.g., machine learning models) trained to determine an estimated revenue value or range based on the product placement opportunity.

In one example, revenue module 408 may analyze the continuity data, including time on screen, product size, and location on screen, the actors or individuals in the media content and any other relevant data to determine a number of impressions or other factors that may be used to calculate an expected revenue generated from the product placement opportunity for a given product. Revenue module 408, which may output revenue data 412 that may include an expected revenue value or range.

Cost module 410 may include one or more algorithms (e.g., machine learning models) trained to determine an estimated cost of virtually and/or digitally inserting a product at one or more product placement locations. The cost module may consider placement location, product size, time on screen, obstructions, whether the product is moving (e.g., a label on the side of a truck) and/or any other information that may affect cost. Cost module 410 may output cost data 414, which may include a cost range and/or value.

Ranking module 416 may include one or more algorithms (e.g., machine learning models) for processing revenue data 412, cost data 414, product rankings 402, continuity data 404, and/or ranked locations 406 for determining optimal product/location 418 for each candidate product and/or each candidate location. The optimal product/location 418 may be the product candidate and location candidate that is most optimal given the ranked products 402, continuity data 404, ranked locations 402, revenue data 412, and/or cost data 414. It is understood that ranking module may alternatively, or additionally be located in shot system 201, product system 202, continuity system 203 and/or may be a stand-alone module and/or system.

Figure 5:
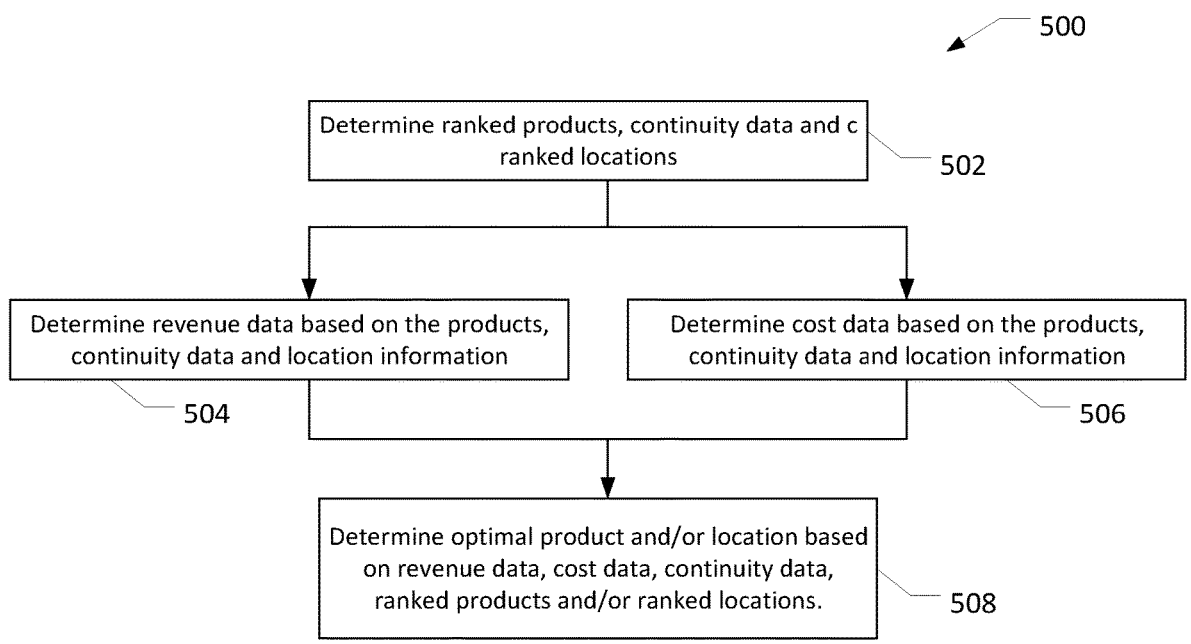
FIG. 5 is a schematic illustration of an example process flow for determining a profit ranking and determining an optimal product for product placement, in accordance with one or more example embodiments of the present disclosure.

Referring now to FIG. 5 exemplary process flow 500 for determining revenue data, cost data, and optimal products and/or locations is depicted. Some or all of the blocks of the process flow in this disclosure may be performed in a distributed manner across any number of devices (e.g., servers and computing devices). Some or all of the blocks of the process flows in this disclosure may be performed in a distributed manner across any number of devices. Some or are all of the operations of the process flow may be optional and may be performed in a different order.

At block 502, computer-executable instructions stored on a memory of a device, such as a server, may be executed to determine ranked products, continuity data and/or ranked locations. The steps performed in FIG. 3 may be executed to determine the foregoing. After block 502, blocks 504 and 506 may be simultaneously executed or may be executed in sequence.

At block 504, computer-executable instructions stored on a memory of a device, such as a server, may be executed to determine revenue data based on the candidate products, continuity data location information (e.g., location size, placement, proximity near certain actor or focal point) and/or any other factors relevant to revenue. At block 506, computer-executable instructions stored on a memory of a device, such as a server, may be executed to determine cost based on the product (e.g., shape complexity, whether 2D or 3D, etc.), the continuity data, location information and/or any other factors relevant to cost.

At block 508, computer-executable instructions stored on a memory of a device, such as a server, may be executed to determine expected profit values for each candidate product and/or each candidate location based on the cost data and revenue data. At block 510, computer-executable instructions stored on a memory of a device, such as a server, may be executed to determine the product and/or location that is most optimal given the ranked products, continuity data, ranked locations, revenue data, and/or cost data.

Illustrative Device Architecture

Figure 6:
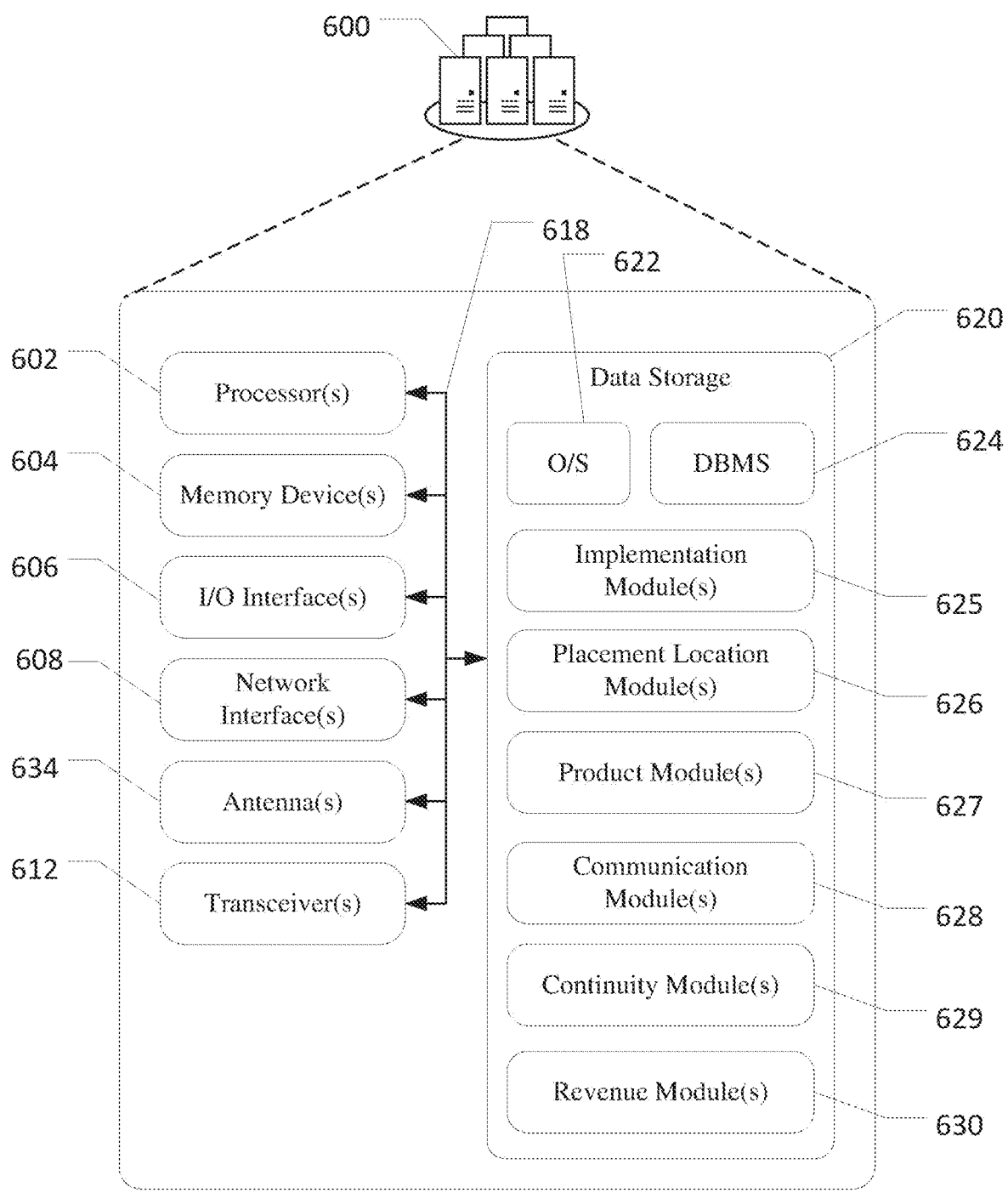
FIG. 6 is a schematic block diagram of a server in accordance with one or more example embodiments of the disclosure.

FIG. 6 is a schematic block diagram of an illustrative sever 600 in accordance with one or more example embodiments of the disclosure. The server 600 may be one or more servers and may include any suitable computing device capable of receiving and/or sending data, and may optionally be coupled to devices including, but not limited to, other servers, computing device, smart device, datastores, or the like. The server 600 may correspond to an illustrative device configuration for servers of FIGS. 1-5.

The server 600 may be configured to communicate via one or more networks with one or more servers, electronic devices, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 600 may include one or more processors (processor(s)) 602, one or more memory devices 604 (generically referred to herein as memory 604), one or more of the optional input/output (I/O) interface(s) 606, one or more network interface(s) 608, one or more transceivers 612, and one or more antenna(s) 634. The server 600 may further include one or more buses 618 that functionally couple various components of the server 600. The server 600 may further include one or more antenna (e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more implementation module(s) 625, one or more placement location module(s) 626, one or more product module(s) 627, one or more communication module(s) 628, one or more continuity module(s) 629, and/or one or more profit module (s) 630. Some or all of these module(s) may be sub-module (s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the implementation module(s) 625 may include computer-executable instructions, code, or the like that responsive to execution by one or more of the processor(s) 602 may perform functions including, but not limited to, overseeing coordination and interaction between one or more modules and computer executable instructions in data storage 620, determining user selected actions and tasks, determining actions associated with user interactions, determining actions associated with user input, responses, messages, commands, instructions and the like.

The placement location module(s) 626 may include computer-executable instructions, code, or the like that responsive to execution by one or more of the processor(s) 602 may perform functions including, but not limited to, determining shot segments of media content, filtering shot segments, determining product placement locations in the shot segments, and ranking the product placement locations.

The product module(s) 626 may include computer-executable instructions, code, or the like that responsive to execution by one or more of the processor(s) 602 may perform functions including, but not limited to, determining contextual factors and values, determining product candidates, and ranking product candidates.

The communication module(s) 628 may include computer-executable instructions, code, or the like that responsive to execution by one or more of the processor(s) 602 may perform functions including, but not limited to, communicating with one or more devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The continuity module(s) 629 may include computer-executable instructions, code, or the like that responsive to execution by one or more of the processor(s) 602 may perform functions including, but not limited to, determining an total screen time amount for a given product and/or product placement location, and any obstructions of the product in the media content.

The continuity module(s) 629 may include computer-executable instructions, code, or the like that responsive to execution by one or more of the processor(s) 602 may perform functions including, but not limited to, determining an total screen time amount for a given product and/or product placement location, and any obstructions of the product in the media content.

The profit module(s) 630 may include computer-executable instructions, code, or the like that responsive to execution by one or more of the processor(s) 602 may perform functions including, but not limited to, determining an estimated revenue value and/or range, determining a cost value and/or range, determining a profit value and/or range, and/or determining a profit ranking.

Referring now to other illustrative components depicted as being stored in the data storage 620, the O/S 622 may be loaded from the data storage 620 into the memory 604 and may provide an interface between other application software executing on the server 600 and hardware resources of the server 600. More specifically, the O/S 622 may include a set of computer-executable instructions for managing hardware resources of the server 600 and for providing common services to other application programs (e.g., managing memory allocation among various application programs). In certain example embodiments, the O/S 622 may control execution of the other program module(s) for content rendering. The O/S 622 may include any operating system now known or which may be developed in the future, including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the server 600, the optional input/output (I/O) interface(s) 606 may facilitate the receipt of input information by the server 600 from one or more I/O devices as well as the output of information from the server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 600 or may be separate. The I/O devices may further include, for example, any number of peripheral devices such as data storage devices, printing devices, and so forth.

The optional I/O interface(s) 606 may also include an interface for an external peripheral device connection such as universal serial bus (USB), Fire Wire, Thunderbolt, Ethernet port or other connection protocol that may connect to one or more networks. The optional I/O interface(s) 606 may also include a connection to one or more of the antenna (e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The server 600 may further include one or more network interface(s) 608 via which the server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna (c) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna (c) 634 may be communicatively coupled to one or more transceivers 612 or radio components to which or from which signals may be transmitted or received.

As previously described, the antenna (e) 634 may include a Bluetooth antenna configured to transmit or receive signals in accordance with established standards and protocols, such as Bluetooth and/or BLE. Alternatively, or in addition to, antenna (e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna (c) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHZ channels (e.g., 802.11n, 802.11ac), or 60 GHz channels (e.g., 802.11ad). In alternative example embodiments, the antenna (c) 634 may be configured to transmit or receive radio frequency signals within any suitable frequency range forming part of the unlicensed portion of the radio spectrum (e.g., 900 MHz).

The antenna (c) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna (e) 634—transmitting or receiving radio frequency (RF) signals in the bandwidth and/or channels corresponding to the communications protocols utilized by the server 600 to communicate with other devices. The transceiver(s) 612 may include hardware, software, and/or firmware for modulating, transmitting, or receiving-potentially in cooperation with any of antenna (c) 634—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the server 600. The transceiver(s) 612 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the server 600 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the server 600 may include alternate and/or additional hardware, software, or firmware components beyond those described or depicted without departing from the scope of the disclosure. More particularly, it should be appreciated that software, firmware, or hardware components depicted as forming part of the server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module (s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    determining, by a computer processor, first, second, and third shot segments of a video;
    determining a first segment quality value of the first shot segment, a second segment quality value of the second shot segment, and a third quality value for the third shot segment;
    determining the third quality value does not satisfy a quality threshold value;
    analyzing the first shot segment and the second shot segment using a first model trained to determine a first product location corresponding to a first position for placement within the first shot segment and a second product location corresponding to a second position for placement within the second shot segment, wherein the first model is a machine learning computer vision model trained to determine locations in shot segments of the digital media for placement of virtual products;
    determining the first product location is the same as the second product location;

determining a first product size and a second product size, the first product size based on the first product location and the second product size based on the second product location;
analyzing the first shot segment and the second shot segment using a second model to determine first contextual data corresponding to the first shot segment and second contextual data corresponding to the second shot segment, wherein the second model is a machine learning model trained to automatically determine contextual data in shot segments of the digital media;
determining a first product and a second product based on the first product location, the second product location, the first contextual data, and the second contextual data;
determining a first contextual value corresponding to the first product and a second contextual value corresponding to the second product, each of the first contextual value and the second contextual value based on the first contextual data and second contextual data;
determining the first contextual value exceeds the second contextual value;
determining a first time period corresponding to the first shot segment and the second shot segment;
determining a first revenue value based on the first product, the first product location, the first product size, the second product location, and the first time period; and
determining a first cost value corresponding to digitally incorporating the first product into the first product location and the second product location.

2. The method of claim 1, further comprising:
determining a third product based on the first contextual data and second contextual data;
determining a second revenue value based on the third product, the first product location, the second product location, and the first time period; and
determining a second cost value corresponding to digitally incorporating the third product into the first product location and the second product location.

3. The method of claim 2, further comprising:
determining to select the first product based on at least the first contextual value, the first revenue value, and the first cost value.

4. The method of claim 1, further comprising:
determining a third product location corresponding to the first shot segment;
determining a first location quality value for the first product location;
determining a second location quality value for the second product location;
determining a third location quality value for the third product location; and
determining the first location quality value and the second location quality value each exceed the third location quality value.

5. A method comprising:
determining, by a computer processor, a first shot segment and a second shot segment of digital media;
analyzing the first shot segment and the second shot segment using a first model to determine a first product location corresponding to a first position for placement within the first shot segment and a second product location corresponding to a second position for placement within the second shot segment, wherein the first model is a machine learning computer vision model trained to determine locations in shot segments of the digital media for placement of virtual products;
determining the first product location is the same as the second product location;
determining a first product size and a second product size, the first product size based on the first product location and the second product size based on the second product location;
analyzing the first shot segment and the second shot segment using a second model to determine first contextual data corresponding to the first shot segment and second contextual data corresponding the second shot segment, wherein the second model is machine learning model trained to automatically determine contextual data in shot segments of the digital media;
determining a first product and a second product based on the first product location, the first contextual data, and the second contextual data;
determining a first revenue value corresponding to the first product and based on the first product, the first product size, and the first product location;
determining a second revenue value corresponding to the second product and based on the second product, the second product size, and the first product location; and
determining the first revenue value exceeds the second revenue value.

6. The method of claim 5, further comprising:
determining a third shot segment of the digital media;
determining a first segment quality value of the first shot segment, a second segment quality value of the second shot segment, and a third quality value of the third shot segment; and
determining the third quality value does not satisfy a quality threshold value.

7. The method of claim 5, further comprising:
determining a first contextual value corresponding to the first product and a second contextual value corresponding to the second product, each of the first contextual value and the second contextual value based on the first contextual data and the second contextual data; and
determining the first contextual value exceeds the second contextual value.

8. The method of claim 7, wherein the first contextual value includes at least one of setting data, actor data, object data, or dimensional data.

9. The method of claim 5, further comprising:
determining a first cost value corresponding to digitally incorporating the first product into the first product location; and
determining to select the first product based on at least the first revenue value and the first cost value.

10. The method of claim 5, wherein the machine learning computer vision model is an occlusion model.

11. The method of claim 5, further comprising determining a first location quality value corresponding to the first product location, wherein the first location quality value is based on a proximity to a center position of the first shot segment and the second shot segment and the first product size.

12. A system comprising:
memory configured to store computer-executable instructions, and
at least one computer processor configured to access memory and execute the computer-executable instructions to:
determine a first shot segment and a second shot segment of digital media;

analyze the first shot segment and the second shot segment using a first model to determine a first product location corresponding to a first position for placement within the first shot segment and a second product location corresponding to a second position for placement within the second shot segment, wherein the first model is a machine learning computer vision model trained to determine locations in shot segments of the digital media for placement of virtual products;

determine the first product location is the same as the second product location;

determining a first product size and a second product size, the first product size based on the first product location and the second product size based on the second product location;

analyzing the first shot segment and the second shot segment using a second model to determine first contextual data corresponding to the first shot segment and second contextual data corresponding to the second shot segment, wherein the second model is a machine learning model trained to automatically determine contextual data in shot segments of the digital media;

determine a first product and a second product based on the first product location, the first contextual data, and the second contextual data;

determine a first revenue value corresponding to the first product and based on the first product and the first product location;

determine a second revenue value corresponding to the second product and based on the second product and the first product location; and determine the first revenue exceeds the second revenue.

13. The system of claim 12, wherein the at least one computer processor is further configured to access the memory and execute the computer-executable instructions to:

determine a third shot segment of the digital media;

determine a first segment quality value of the first shot segment, a second segment quality value of the second shot segment, and a third quality value of the third shot segment; and determine the third quality value does not satisfy a quality threshold value.

14. The system of claim 12, wherein the at least one computer processor is further configured to access the memory and execute the computer-executable instructions to:

determine a first contextual value corresponding to the first product and a second contextual value corresponding to the second product, each of the first contextual value and the second contextual value based on the first contextual data and the second contextual data; and determine the first contextual value exceeds the second contextual value.

15. The system of claim 12, wherein the first contextual value includes at least one of setting data, actor data, object data, or dimensional data.

16. The system of claim 12, wherein the at least one computer processor is further configured to access the memory and execute the computer-executable instructions to:

determine a first cost value corresponding to digitally incorporating the first product into the first product location; and determine to select the first product based on at least the first revenue value and the first cost value.

17. The system of claim 12, wherein the machine learning computer vision model is an occlusion model.

18. The system of claim 12, wherein the at least one computer processor is further configured to access the memory and execute the computer-executable instructions to determine a first location quality value corresponding to the first product location, wherein the first location quality value is based on a proximity to a center position of the first shot segment and the second shot segment and the first product size.

* * * * *